United States Patent [19]

Bacha

[11] 4,283,616

[45] Aug. 11, 1981

[54] GAS METAL ARC WELDING METHOD FOR PREPARING MISALIGNED TUBE HOLES

[75] Inventor: F. Timothy Bacha, Crown Point, Ind.

[73] Assignee: Carrier Corporation, Syracuse, N.Y.

[21] Appl. No.: 108,265

[22] Filed: Dec. 28, 1979

Related U.S. Application Data

[62] Division of Ser. No. 896,125, Apr. 14, 1978, Pat. No. 4,225,772.

[51] Int. Cl.³ ............................................. B23K 9/04
[52] U.S. Cl. .............................. 219/76.14; 219/60.2; 219/137 R
[58] Field of Search .............. 219/76.14, 137 R, 60.2; 228/119

[56] References Cited

U.S. PATENT DOCUMENTS

| | | |
|---|---|---|
| 1,508,713 | 9/1924 | Noble . |
| 3,426,170 | 2/1969 | Miller .......................... 219/137 R X |
| 3,440,393 | 4/1969 | Henderson . |
| 3,567,900 | 3/1971 | Nelson . |
| 3,590,212 | 6/1971 | Corrigall . |
| 3,597,576 | 8/1971 | Bernard . |
| 3,623,129 | 11/1977 | Miles ............................ 219/137 R X |
| 4,047,656 | 9/1977 | McCombs . |
| 4,049,941 | 9/1977 | Beatty .......................... 219/137 R X |

FOREIGN PATENT DOCUMENTS

| | | |
|---|---|---|
| 2628829 | 1/1978 | Fed. Rep. of Germany . |
| 288949 | 5/1969 | U.S.S.R. . |
| 258489 | 4/1970 | U.S.S.R. . |
| 582073 | 11/1977 | U.S.S.R. . |

Primary Examiner—E. A. Goldberg
Attorney, Agent, or Firm—J. Raymond Curtin; John S. Sensny

[57] ABSTRACT

A welding apparatus including a nozzle assembly having a contact extension and a contact tip for guiding a consumable welding wire into a tube hole. The consumable welding wire is guided into the tube hole and an electric current is passed to the wire to produce an arc between the tip of the wire and the sidewall of the tube hole, melting the wire and supplying filler weld to the hole. The nozzle assembly has a gas nozzle; and, during the welding process, an inert gas is delivered into the tube hole through the gas nozzle.

3 Claims, 5 Drawing Figures

GAS METAL ARC WELDING METHOD FOR PREPARING MISALIGNED TUBE HOLES

This is a division of application Ser. No. 896,125, filed Apr. 14, 1978, now U.S. Pat. No. 4,225,772, issued Sept. 30, 1980.

BACKGROUND OF THE INVENTION

This invention relates generally to welding, and more particularly to a gas metal arc welding method for repairing misaligned tubesheet holes.

Heat exchangers are often comprised of a multiplicity of heat exchange tubes which extend between and are generally supported by at least one tubesheet. The tubesheet has a series of holes cut therein and the tubes are inserted into the holes in the tubesheet. A tubesheet may contain up to, or more than, a thousand tube holes each of which must be precisely machined in order to allow proper tube alignment and intertube clearance. If a tube hole is drilled off location, preferably the tubesheet is repaired and then the hole is redrilled. Otherwise, precise tube alignment is impossible for that hole, and the surrounding tubes may not have the proper clearance for satisfactory fluid flow around the tube.

Gas metal arc welding (GMAW) is a relatively rapid and inexpensive method of filling an opening in a metal work. In GMAW welding, a metallic, consumable wire is continuously fed through a nozzle. An arc is developed between the tip of the wire and the work, melting the wire and producing a pool of filler weld, which subsequently solidifies. As the weld is produced, an inert gas is directed to the weld area, shielding the weld to prevent contamination of the weld by oxygen, dirt, or other particles which would otherwise be present in the atmosphere adjacent to the weld. This shielding inert gas is heated by the arc which is maintained between the tip of the consumable wire and the work. Inside the constrained confinement of a small diameter tube hole, the heated, inert gas tends to concentrate near the bottom of the nozzle. Prior art GMAW welding devices have not been designed to withstand the temperature which can be reached within the tube hole; and, accordingly, the prior art devices have not been suitable to repair misaligned tube holes.

Heretofore misaligned tubesheet holes have been commonly repaired either by cutting out a relatively large segment of the tubesheet and welding a replacement piece into its position, or by gouging out a large volume of material in the vicinity of the misaligned tube hole and welding a filler piece to the tubesheet. These techniques, in addition to being expensive, time consuming, and requiring extensive manual labor, may cause distortion of surrounding holes. This results in difficulty in installing and sealing heat exchange tubes to the tubesheet. Thus, in the past, repairing misaligned tubesheet holes has been a slow and expensive process and has customarily led to unsatisfactory results.

In accordance with the present invention, it has been learned that by properly electrically and thermally insulating portions of a gas metal arc welding (GMAW) apparatus, the apparatus can be successfully used within the constrained confinement of a tube hole having a diameter in the vicinity of ⅝ of an inch. By constructing and using a gas metal arc welding apparatus according to the present invention, both the cost and time required to fill misaligned tube holes are substantially reduced. Moreover, it has been learned that by imparting circular type motion to the consumable wire as it exits the welding apparatus to bring the tip of the wire closer to the sidewall of the tube hole, an excellent metallurgical bond can be developed between the wire as it melts in the tube hole and the tube hole sidewall, leading to a very satisfactory filling of the misaligned hole.

The most relevant prior art appears to be U.S. Pat. Nos. 4,047,656 and 3,567,900 and U.S.S.R. Certificates of Inventorship Nos. 288,949 and 258,429. The latter three references are relevant in that they disclose welding apparatus wherein a consumable wire exits the nozzle of the apparatus at an angle to the centerline of the nozzle. Further, the last two of these cited references show the consumable wire exiting the nozzle of the welding apparatus at an offset from, as well as at an angle to, the centerline of the nozzle assembly. The first of the above listed references is relevant because it shows a welding apparatus including an eccentric mounting for providing circular motion. In addition, all of these references are relevant to the present disclosure in that they show welding apparatus wherein the consumable electrode is moved through an oscillatory or circular path during the welding process. These features, as discussed in greater detail below, are also incorporated into the welding method of the present invention.

None of the above cited references, however, suggests the unique type of nozzle construction disclosed herein which permits the welding method of the present invention to be used to fill a misaligned, small diameter tube hole. Furthermore, these references do not suggest the combination, which is disclosed herein, of a consumable electrode exciting the nozzle at an offset from and at an angle to the centerline of the nozzle, an orbital type of motion wherein the nozzle orbits the centerline of a tube hole, and a rotational type of motion wherein the nozzle rotates about its own axis as it orbits the centerline of the tube hole. This combination of factors results in the electrode being constantly positioned almost directly against the tube hole sidewall, resulting in the production of an excellent metallurgical bond between the tube hole sidewall and the weld which is deposited in the tube hole. With these features, the welding method of the present invention can be used to effectively fill misaligned tube holes in a very simple, inexpensive, and efficient manner. Accordingly, it is believed that the present disclosure patentably distinguishes from the above cited prior art.

SUMMARY OF THE INVENTION

In view of the foregoing, an object of this invention is to provide a new welding method.

Another object of this invention is to furnish a gas metal arc welding method for repairing small diameter tube holes.

A further object of this invention is to supply a gas metal arc welding method which is not affected by the high temperatures generated while the method is used to repair a small diameter tube hole.

Still another object of this invention is to provide a gas metal arc welding method which produces a satisfactory welding arc between the end of a consumable welding wire and the sidewalls of a small diameter tube hole.

These and other objectives are attained with a gas metal arc welding apparatus including a novel nozzle assembly having means, comprising in a preferred mode a contact extension and a contact tip, for guiding a consumable welding wire through the nozzle assembly and into a tube hole. The nozzle assembly is positioned inside a misaligned tube hole and a consumable welding wire is guided into the tube hole. An electric current is passed to the welding wire so that an arc develops between the tip of the wire and the sidewall of the tube hole, melting the wire and supplying weld filler to the hole. The nozzle assembly has a gas nozzle; and, during the welding process, an inert gas is delivered through the gas nozzle and into the tube hole, shielding the arc and the filler material to prevent contamination of the weld metal. This gas is heated by the arc, and the constrained confinement of the tube hole causes a concentration of heat at the lower end of the gas nozzle and the contact tip. To protect the gas nozzle from this heat, it is constructed of a heat resistance material; and to protect the contact tip from the heat, it is covered with a heat resistant contact tip cap. Moreover, in a preferred embodiment, to prevent an electrical short circuit from developing between the contact tip and the gas nozzle or the sidewall of the tube hole, lower portions of the contact tip are covered with a ceramic sleeve.

Further benefits and advantages of the invention will become apparent from a consideration of the following description and drawings.

DETAILED DESCRIPTION OF THE PREFERRED EMBODIMENT

Figure 1:
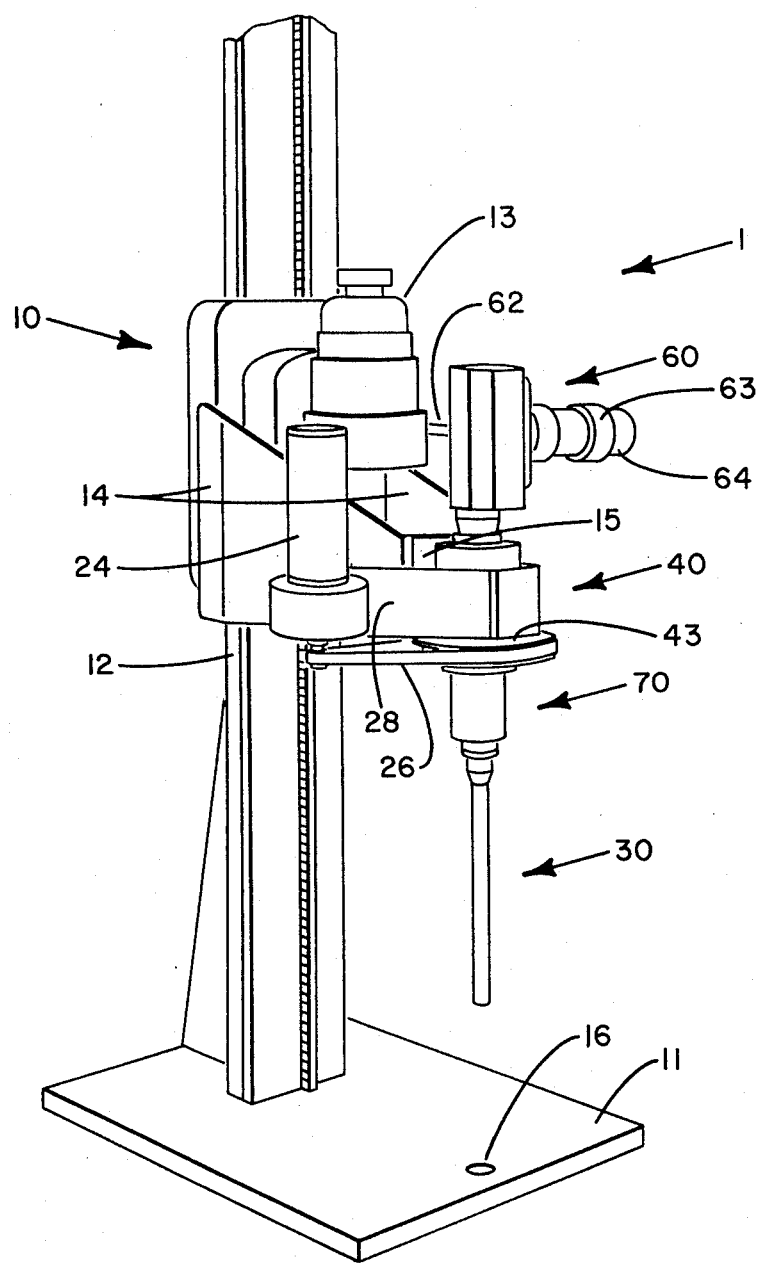
FIG. 1 is a perspective view of a welding apparatus specifically designed for use in the present invention.
Figure 2:
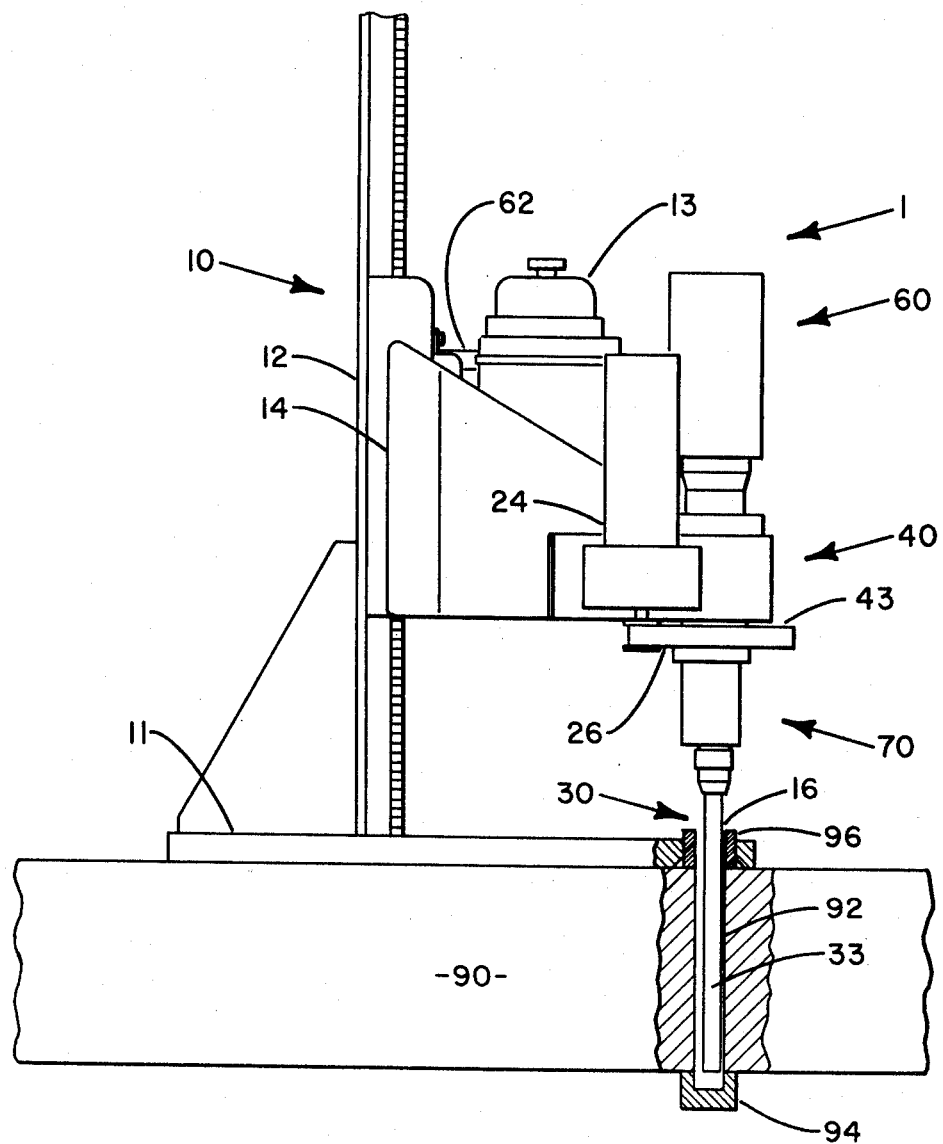
FIG. 2 is a side view of the apparatus shown in FIG. 1 with the nozzle assembly of the apparatus lowered into a tube hole.

Referring to the drawings, FIGS. 1 and 2 depict a welding apparatus 1 specifically designed for use in the present invention. The apparatus 1 includes, generally, a vertical travel mechanism 10, a nozzle assembly 30, an eccentric bearing assembly 40, a welding torch 60, and a coupling assembly 70. The travel mechanism 10 is of conventional design and comprises a base 11, a vertical travel rail 12, a motor 13, support arms 14, and a bracket 15. When the welding apparatus 1 is placed, as shown in FIG. 2, on a tubesheet 90, the travel mechanism 10 can be used to raise and lower the nozzle assembly 30, the bearing assembly 40, the torch 60, and the coupling assembly 70 so that the lower portion of the nozzle assembly automatically passes vertically through a tube hole 92 at a controlled rate.

Figure 3:
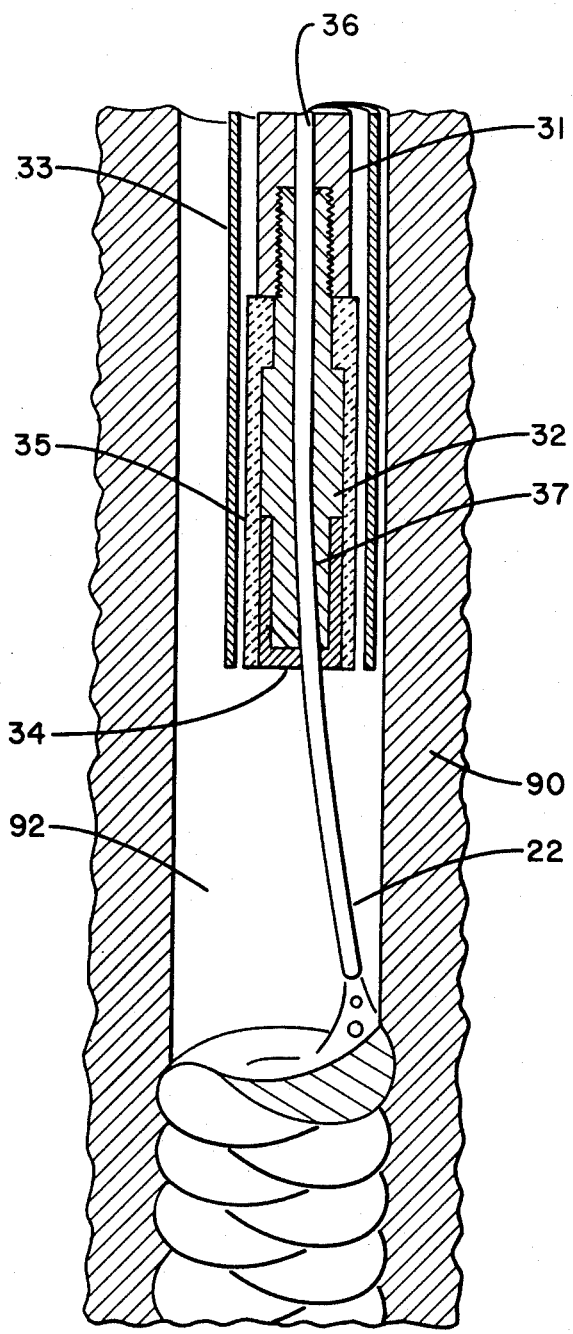
FIG. 3 is an enlarged cross-sectional view of the lower portion of the nozzle assembly of the apparatus shown in FIGS. 1 and 2, with the lower portion of the nozzle assembly inside a tube hole of a tubesheet.

To repair a misaligned tube hole 92, a starting well 94 is secured to the tube sheet 90 to cover the bottom of the hole, and a runoff extension cylinder 96 is secured to the top of the tube sheet concentric with the hole. The base 11 is then placed on the tubesheet 90 so that the cylinder 96 fits within a hole 16 in the base. The cylinder 96 thus serves to properly align the base 11 and the welding apparatus 2 with the tube hole 92. Once the welding apparatus is properly aligned, the lower portion of the nozzle assembly 30 is lowered through the cylinder 96, the hole 16, and the base 11 into the tube hole 92 to the position shown in FIG. 2. Referring to FIGS. 1, 2, and 3, a consumable welding wire 22 (shown only in FIG. 3) is then fed, in a manner described in detail below, through the torch 60, the eccentric bearing assembly 40, the coupling assembly 70, and the nozzle assembly 30, emerging from the lower end of the nozzle assembly in the tube hole 92. An electric current is passed to the wire 22 from a power source (not shown in the drawings) so that an arc develops between the end of the wire in the tube hole 92 and the sidewall of the hole, causing the wire 22 to melt. The nozzle assembly 30 is gradually raised, and the welding wire 22 is continuously fed into the hole 92. The arc causes the wire 22 to melt and the molten metal fills the hole 92 and solidifies. Metal transfer from the wire 22 to the hole 92 can be considered to be 100% because any random weld spatter is contained within the hole and reconsumed. The amount of spatter adherence to the nozzle assembly 30 is negligible. The welding process continues until the tube hole 92 is completely filled, and the process is terminated when the filler weld rises into the area within the runoff extension cylinder 96. Then the welding apparatus 2 is removed, the starting well 94 and the cylinder 96 are removed, and the filler weld can be machined to form a surface level with the surface of the tubesheet 90.

The method of the present invention has been successfully used to fill tube holes having a diameter of approximately $\frac{5}{8}$ of an inch. It should be understood, though, that the present invention is not restricted to such dimensions.

The major parameter of control of the above described welding method is the wire feed speed through the torch 60 and nozzle assembly 30 into the tube hole 92. When determining the proper wire feed speed, the basic consideration is to adjust the wire feed speed so that the volumetric rate of wire emerging from the nozzle assembly 30 equals the rate at which the wire melts and the molten metal is deposited in the tube hole 92. Once the wire feed speed is determined, all other welding parameters can be tailored to fit that wire feed speed.

Turning back to the structure of the welding apparatus 1, the nozzle assembly 30 includes a contact extension 31 and a contact tip 32 for guiding the consumable wire 22 through the nozzle assembly and into the tube hole 92. The contact extension 31 and the contact tip 32 also pass the electric current to the consumable wire 22. The nozzle assembly 30 also includes a gas nozzle 33; and, during the welding process, an inert shielding gas is passed through the torch 60, through the gas nozzle 33 and into the tube hole 92. This gas floods the inside of the tube hole 92 and prevents contamination of the weld by oxygen, dirt, or other particles which would otherwise be present in the atmosphere adjacent to the weld. While many known mixtures of inert gas may be used, 100% helium has been found to give excellent results.

As the inert gas exits the gas nozzle 33, it is heated by the arc between the consumable wire 22 and the sidewall of the hole 92. As best understood from FIG. 3, the restrictive configuration of the hole 92 allows the hot gases to escape only through the space between the inner diameter of the tube hole and the outer diameter of the gas nozzle 33. This restrictive escape path causes a concentration of heat at the bottom of the contact tip 32 and the gas nozzle 33. In order to prevent the gas nozzle 33 from melting, it is constructed of a heat resistant material such a Molybdenum tubing. Molybdenum is preferred because of its relatively high melting point (4,748 degrees Fahrenheit) and because of its availability. To prevent the contact tip 32 from melting, a contact tip cap 34, constructed of a heat resistant material such as a tantalum-10% tungsten refractory alloy, covers the lower portion of the contact tip. Again, although many suitable alloys may be used to cap the contact tip 32, the tantalum-10% alloy is preferred because of its high melting point (5,400 degrees Fahrenheit) and its relatively high electrical conductivity.

The electric current, which generates the arc, passes from the power source (not shown) through the welding torch 60, through the contact extension 31, the contact tip 32, and the contact tip cap 34, to the consumable wire 22. In the preferred apparatus illustrated in the drawings, in order to minimize the risk of a short circuit developing between the contact tip 32 or the contact tip cap 34 and the gas nozzle 33 or the sidewall of the tube hole 92, the sides of the contact tip 32 and the contact tip cap 34 are covered with a sleeve of ceramic insulation 35. The insulator 35 also serves to center the contact tip 32 within the lower portion of the nozzle assembly 30 and provides further thermal insulation for the contact tip. In a preferred embodiment, the insulating sleeve 35 is constructed of "Macor" glass ceramic.

The above described nozzle construction, especially the synergistic result of the heat resistant gas nozzle 33, the contact tip cap 34, and the ceramic sleeve 35, which is not suggested by any of the prior art devices, permits a heretofore unobtainable result—gas metal arc welding within the narrow confines of a small diameter tube hole. By using the method of the present invention in the manner discussed above, both the cost and complexity of refilling misdrilled tube holes, as well as the time required by the process, are significantly reduced.

Figure 4:
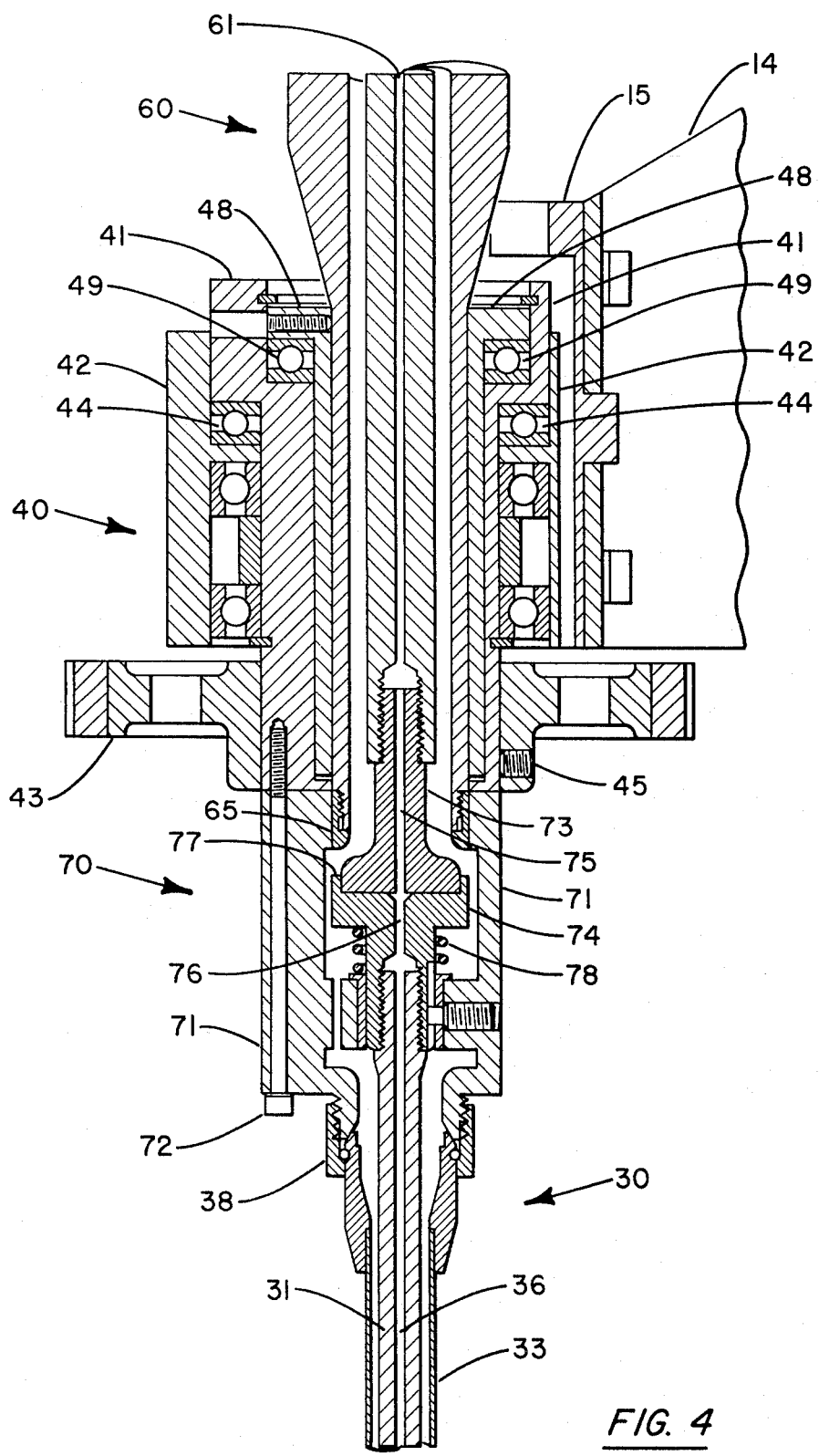
FIG. 4 is an enlarged cross-sectional view of the eccentric bearing assembly and the coupling assembly of the welding apparatus shown in FIGS. 1 and 2.

The welding torch 60, the nozzle assembly 30, and the coupling assembly 70 are supported by the eccentric bearing assembly 40, shown in greater detail in FIG. 4. The eccentric bearing assembly 40 includes an eccentric bearing 41, a bearing assembly support 42, and a pulley 43. The bearing assembly support 42 is rigidly secured to bracket 15 of the vertical drive mechanism 10 and rotatably supports the remainder of the eccentric bearing assembly 40 by means of a bearing 44. The pulley 43, which is connected to an electric motor 24 (shown only in FIGS. 1 and 2) by a rubber timing belt 26, is rigidly secured to the eccentric bearing 41 by a set screw 45 so that the eccentric bearing 41 and the pulley 43 rotate unitarily. Referring back to FIG. 1, the electric motor 24 is supported by an arm 28, which is secured to the bearing assembly support 42.

Figure 5:
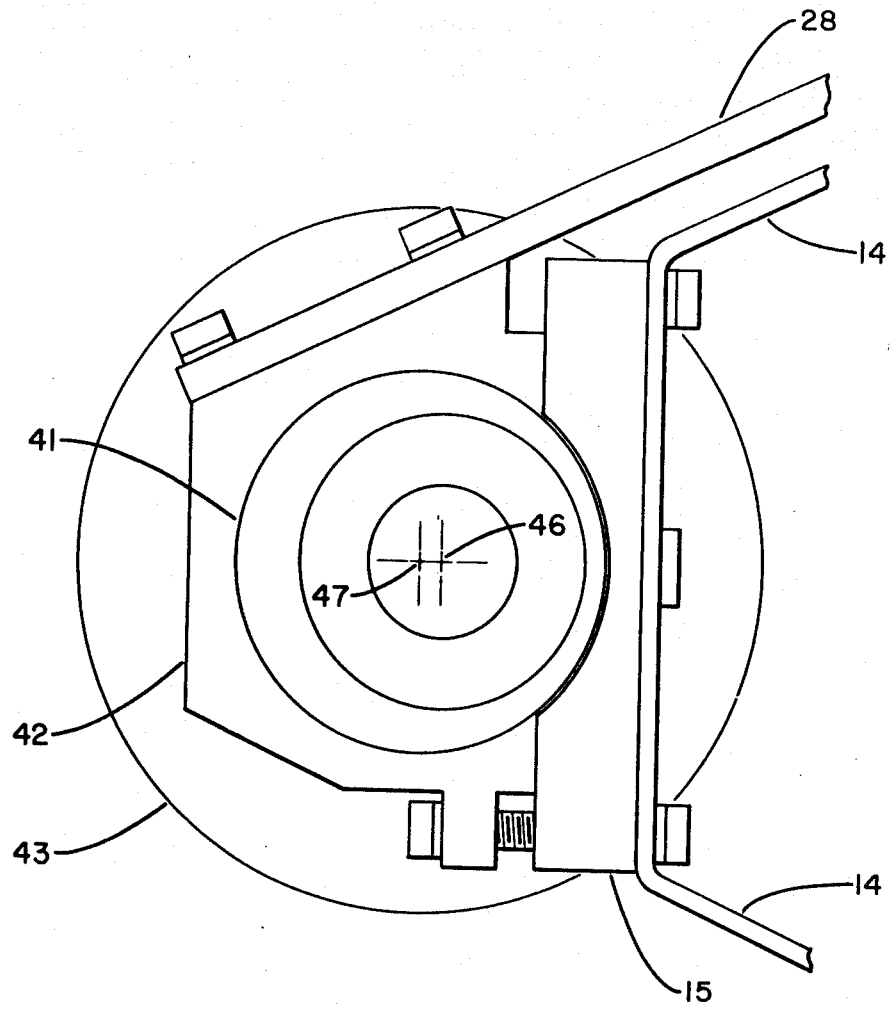
FIG. 5 is an enlarged top view of the pulley and eccentric bearing of the welding apparatus shown in FIGS. 1 and 2.

As shown best in FIG. 5, the centerline 46 of the cavity defined by the eccentric bearing 41 is offset from the centerline 47 of the pulley 43. Accordingly, as the pulley 43 and bearing 41 are rotated by the electric motor 24 and belt 26, the centerline 46 of the cavity defined by the eccentric bearing moves in an orbital path about the centerline 47 of the pulley.

Referring back to FIG. 4, the welding torch 60 extends through the eccentric bearing assembly 40. The torch 60 includes a wire conduit 61 for guiding the consumable welding wire through the torch 60 and the eccentric bearing assembly 40. A bushing 48, which is rotatably supported relative to the eccentric bearing 41 by means of a bearing 49, is provided to support the welding torch 60 and to center the wire conduit 61 within the cavity defined by the eccentric bearing. Thus, as the eccentric bearing 41 rotates, the wire conduit 61 moves with the centerline 46 of the cavity defined by the eccentric bearing in an orbital, circular path around the centerline 47 of the pulley 43.

It is preferred that the torch 60 not rotate with or in harmony with the eccentric bearing 41 in order that the wires (not shown in the drawings) connecting the torch with, for example, the power source and the source of the consumable wire do not become twisted during the welding process. That is, it is desired that the wire conduit 61 not rotate about its own centerline as it moves about, or orbits, the centerline 47 of the pulley 43. To this end, referring back to FIGS. 1 and 2, a torch restraint 62 is provided. The restraint 62 is rigidly secured to a support arm 14 of the vertical travel mechanism 10 and includes a circular bracket 63 which loosely fits over the torch handle 64. A loose fit is necessary to allow the movement of the torch 60 necessitated by the orbital motion of the wire conduit 61 about the centerline 47 of the pulley 43, but the restraint 62 is sufficient to prevent the torch 60 from rotating in harmony with the eccentric bearing 41, preventing twisting of the wires referred to above.

The interior of the contact extension 31 of the nozzle assembly 30 defines a tubular passageway 36; and, in a manner to be discussed subsequently, the nozzle assembly 30 is connected to the eccentric bearing assembly 40 via the coupling assembly 70 so that the tubular passageway 36 is always aligned with the wire conduit 61 of the torch 60. Hence, the tubular passageway 36 is aligned with the centerline 46 of the cavity defined by the eccentric bearing 41. The nozzle assembly 30 can be inserted into the tube hole 92 so that the centerline 47 of the pulley 43 is aligned with the centerline of the hole. In this case, the tubular passageway 36 will be at a radial offset from the tube hole centerline. Rotation of the eccentric bearing 41, then, causes the nozzle assembly 30, the tubular passageway 36, and the centerline of the consumable wire 22 that is fed through the passageway to move in an orbital path about the hole centerline at a diameter equal to twice the radial offset. That is, the centerline of the consumable wire moves in a circular path inside the tube hole 92. This motion brings the tip of the consumable wire 22 closer to the sidewall of the tube hole 92 which results in a more direct arc impingement between the wire and the hole sidewall. This substantially improves the weld which develops in the hole 92. In view of the above, the maximum allowable displacement between the centerline 47 of the pulley 43 and the centerline 46 the cavity defined by the eccentric bearing 41 is the radius of the tube hole 92 minus the outer radius of the gas nozzle 33 of the nozzle assembly 30.

The attainment of the above described orbital motion of the nozzle assembly 30 does not require that the nozzle assembly 30 rotate unitarily with the eccentric bearing 41. However, in a preferred embodiment, for the reason discussed below, the nozzle assembly 30 does rotate unitarily with the eccentric bearing 41.

The interior of the contact tip 32, which guides the wire 22 as it exits the nozzle assembly 30, defines a curved tubular passageway 37. In this manner, as shown best by FIG. 3, the consumable welding wire 22 exits the nozzle assembly 30 at an angle to and at an offset from the centerline of the nozzle assembly. By rotating the entire nozzle assembly 30, including the contact tip 32, unitarily with the eccentric bearing 41, the contact tip makes one complete rotation about its own centerline everytime the nozzle assembly completes one orbit around the centerline of the tube hole 92. In this way, the wire 22 is continuously curved toward the sidewall of the tube hole 92 as it leaves the nozzle assembly 30. This configuration produces, as shown in FIG. 3, a weld grain structure in the tube hole 92 which has the appearance of being welded in layers. This is an illusion in that the weld is composed of a single vertical spiral bead. The rotation of the arc around the inside of the tube hole 92 allows the weld to solidify on one side of the hole while the arc is directed toward the other side. The weld then progresses over the solidified portions during the arc rotation, thus producing the layered effect. The weld also shows penetration into the sidewall of the tube hole 92 which is due to the fact that part of the sidewall, as well as the consumable wire, is melted by the arc.

The above-discussed, unique combination of orbital motion, rotational motion, and curved delivery passageway allows the arc that develops between the end of the consumable wire 22 and the tube hole 92 to be positioned directly against the sidewall of the tube hole at all times during the welding process, producing excellent results. Thus, the present invention not only reduces the cost and complexity of refilling misaligned tube holes, but also substantially improves the quality of the results.

The coupling assembly 70, also shown in greater detail in FIG. 4, is provided for connecting the nozzle assembly 30 with the eccentric bearing assembly 40 so that the nozzle assembly and the eccentric bearing 41 rotate unitarily, and for supplying continuous electrical contact between the welding torch 60 and the contact extension 31. Further, the coupling assembly 70 guides the consumable wire 22 from the welding torch 60 down to the nozzle assembly 30 in a manner which allows for relative movement between the nozzle assembly, which rotates unitarily with the eccentric bearing 41, and the welding torch, which, as discussed above, does not rotate with the eccentric bearing. The coupling assembly 70 includes a body 71 which is rigidly secured to the eccentric bearing 41 by means of a screw 72, and the nozzle assembly 30 is rigidly secured to the body 71 by a collar 38. In this manner, the eccentric bearing 41, the body 71 of the coupling assembly, and the nozzle assembly 30 all rotate unitarily. The body 71 also guides the shielding inert gas from the welding torch 60 to the gas nozzle 33. A seal 65 is employed at the connection between the welding torch 60 and the body 71 to prevent the inert gas from escaping through that connection. Moreover, the body 71 and collar 38 are designed so that, when the nozzle assembly 30 is secured to the body 71, the tubular passageway 36 of the contact extension 31, which is centered within the nozzle assembly, is aligned with the centerline 46 of the eccentric bearing 41.

The coupling assembly 70 also includes coupling members 73 and 74 that connect the contact extension 31 of the nozzle assembly 30 with the wire conduit 61 of the welding torch 60. The coupling members 73 and 74 pass the arc generating electric current from the welding torch 61 to the contact extension 31 and guide the consumable welding wire 22 from the welding torch to the contact extension. The interiors of the coupling members 73 and 74 define tubular passageways 75 and 76, respectively, that are aligned with each other, with the passageway 36 of the contact extension 31, and with the wire conduit 61 of the welding torch 60. The passageways 75 and 76 guide the consumable wire 22 from the welding torch 60 through the coupling assembly 70 to the contact extension 31. Coupling member 73 rests on coupling member 74, and these coupling members have colinear longitudinal axes, which are also colinear with the longitudinal axes of their respective tubular passageways 75 and 76. Thus, the coupling members 73 and 74 can rotate independent of each other about their longitudinal axes without their respective tubular passageways 75 and 76 becoming misaligned. Coupling member 74 includes an upper flange 77 which restrains the coupling members 73 and 74 from relative transverse movement, which would cause the tubular passageways 75 and 76 to become misaligned. A spring 78 is provided for biasing the coupling member 74 in the upward direction so that the top of coupling member 74 remains in continuous contact with the bottom of the coupling member 73. This relationship maintains an unbroken channel for the consumable wire 22 from the welding torch 60 to the contact extension 31 and insures continuous electrical contact between the welding torch and the contact extension while allowing for relative movement between the contact extension, which rotates unitarily with the nozzle assembly 30 and, thus, the eccentric bearing 41, and the welding torch, which does not rotate unitarily with the eccentric bearing.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. A gas metal arc welding method for repairing a relatively small diameter tube hole including the steps of:
   guiding a consumable wire from a welding torch, through a guide means, and into the tube hole;
   directing the consumable wire toward the tube hole sidewall as the wire exits the guide means;
   thermally and electrically protecting the lower part of the guide means;
   directing an inert gas from the welding torch, through a gas nozzle, and into the tube hole;
   rotatably connecting the gas nozzle with the welding torch for allowing relative rotation therebetween while directing the inert gas therebetween;
   rotatably connecting the guide means with the welding torch for allowing relative rotation therebetween while guiding the consumable wire therebetween;
   conducting an electric current between the welding torch and the guide means; and
   vertically passing the nozzle assembly through the tube hole at a controlled rate.

2. The method as defined by claim 1 further including the step of orbiting the guide means about the centerline of the tube hole.

3. The method as defined by claim 2 wherein the step of directing the consumable wire toward the tube hole sidewall includes the step of curving the consumable wire relative to the centerline of the tube hole.

* * * * *